US008125470B2

(12) United States Patent
Nomura et al.

(10) Patent No.: US 8,125,470 B2
(45) Date of Patent: Feb. 28, 2012

(54) ELECTRON SOURCE, IMAGE DISPLAY APPARATUS, AND INFORMATION DISPLAY REPRODUCING APPARATUS

(75) Inventors: Kazushi Nomura, Sagamihara (JP); Ryoji Fujiwara, Chigasaki (JP); Michiyo Nishimura, Sagamihara (JP); Yoji Teramoto, Ebina (JP); Shunsuke Murakami, Atsugi (JP)

(73) Assignee: Canon Kabushiki Kaisha, Tokyo (JP)

( * ) Notice: Subject to any disclaimer, the term of this patent is extended or adjusted under 35 U.S.C. 154(b) by 262 days.

(21) Appl. No.: 12/302,330

(22) PCT Filed: Feb. 29, 2008

(86) PCT No.: PCT/JP2008/054106

§ 371 (c)(1),
(2), (4) Date: Nov. 25, 2008

(87) PCT Pub. No.: WO2008/108453

PCT Pub. Date: Sep. 12, 2008

(65) Prior Publication Data

US 2009/0322712 A1 Dec. 31, 2009

(30) Foreign Application Priority Data

Mar. 5, 2007 (JP) ................................ 2007-053962

(51) Int. Cl.
*G06F 3/038* (2006.01)
*G09G 5/00* (2006.01)
*G09G 3/30* (2006.01)

(52) U.S. Cl. ......................................... 345/204; 345/76

(58) Field of Classification Search .................. 313/310, 313/495; 349/124; 324/750.3; 315/169.1; 345/32, 78, 75.2, 76; 257/40, 401, 773
See application file for complete search history.

(56) References Cited

U.S. PATENT DOCUMENTS

| | | | | |
|---|---|---|---|---|
| 5,905,335 | A | 5/1999 | Fushimi et al. | |
| 5,939,823 | A | 8/1999 | Kiyomiya et al. | |
| 5,955,850 | A * | 9/1999 | Yamaguchi et al. | 313/495 |
| 6,218,778 | B1 | 4/2001 | Tomita et al. | |
| 6,267,636 | B1 | 7/2001 | Onishi et al. | |
| 6,379,211 | B2 | 4/2002 | Onishi et al. | |
| 6,717,340 | B2 | 4/2004 | Nishimura | |
| 6,853,126 | B2 | 2/2005 | Nomura | |
| 6,975,288 | B2 | 12/2005 | Nishimura et al. | |

(Continued)

FOREIGN PATENT DOCUMENTS

| | | |
|---|---|---|
| JP | 8-96703 | 4/1996 |

(Continued)

*Primary Examiner* — Quan-Zhen Wang
*Assistant Examiner* — Lin Li
(74) *Attorney, Agent, or Firm* — Fitzpatrick, Cella, Harper & Scinto

(57) ABSTRACT

There is provided an electron source including: an insulating substrate; a first wiring that is arranged on the insulating substrate; a second wiring that is arranged on the insulating substrate and intersects with the first wiring; and an electron-emitting device having a cathode electrode provided with an electron-emitting member and a gate electrode arranged above the cathode electrode, which is arranged on the insulating substrate and is separated from an intersecting portion of the first wiring with the second wiring; wherein the first wiring is arranged on the second wiring via an insulating layer; the gate electrode is provided with a plurality of slit-like openings that is arranged in substantially parallel at intervals; and the opening is arranged so that an extended line in a longitudinal direction thereof intersects with the first wiring.

8 Claims, 15 Drawing Sheets

U.S. PATENT DOCUMENTS

| | | | | |
|---|---|---|---|---|
| 7,021,981 | B2 | 4/2006 | Onishi et al. | |
| 7,074,102 | B2 | 7/2006 | Teramoto | |
| 7,109,663 | B2 | 9/2006 | Fujiwara et al. | |
| 7,259,520 | B2 | 8/2007 | Fujiwara et al. | |
| 7,391,150 | B2 | 6/2008 | Nomura | |
| 7,405,092 | B2 | 7/2008 | Nishimura | |
| 7,435,689 | B2 | 10/2008 | Teramoto | |
| 7,456,565 | B2 | 11/2008 | Nomura et al. | |
| 2002/0041163 | A1* | 4/2002 | Ichikawa | 315/169.1 |
| 2005/0202745 | A1 | 9/2005 | Nishimura | |
| 2006/0066199 | A1 | 3/2006 | Ichikawa et al. | |
| 2006/0125370 | A1 | 6/2006 | Nishimura et al. | |
| 2007/0064187 | A1* | 3/2007 | Takeda et al. | 349/127 |
| 2007/0188068 | A1 | 8/2007 | Murakami | |
| 2007/0257593 | A1 | 11/2007 | Murakami | |
| 2008/0012463 | A1 | 1/2008 | Fujiwara et al. | |
| 2008/0070468 | A1 | 3/2008 | Ichikawa et al. | |
| 2008/0122336 | A1* | 5/2008 | Nukanobu et al. | 313/310 |
| 2009/0026914 | A1 | 1/2009 | Nomura et al. | |
| 2009/0108727 | A1 | 4/2009 | Nomura et al. | |
| 2009/0111350 | A1 | 4/2009 | Teramoto et al. | |
| 2009/0117811 | A1 | 5/2009 | Fujiwara et al. | |
| 2009/0140627 | A1 | 6/2009 | Teramoto et al. | |
| 2009/0153013 | A1 | 6/2009 | Nishimura et al. | |
| 2009/0153014 | A1 | 6/2009 | Nomura et al. | |
| 2009/0167645 | A1* | 7/2009 | Kishi | 345/76 |

FOREIGN PATENT DOCUMENTS

| | | |
|---|---|---|
| JP | 8-115654 | 5/1996 |
| JP | 8-315723 | 11/1996 |
| JP | 11-111156 | 4/1999 |
| JP | 2003-151456 | 5/2003 |

* cited by examiner

A-A' CROSS SECTION 12
14

21
24

25

23

22

13
13a

11

30
24

101
102

103
104

105

106

107

108
109

110
110a

111

112
104

113

ELECTRON SOURCE, IMAGE DISPLAY APPARATUS, AND INFORMATION DISPLAY REPRODUCING APPARATUS

TECHNICAL FIELD

The present invention relates to an electron source that is used for a television set, a display of a computer, and an electron beam drawing apparatus or the like, an image display apparatus, and an information display reproducing apparatus.

BACKGROUND ART

In recent years, an FED (a field emission display) has drawn attention. The FED is generally provided with an RP (a rear plate) having a field emission type electron-emitting device arranged thereon in response to each pixel arranged in a two-dimensional matrix and an FP (face plate) having a light emitting layer that emits a light due to a crash of electrons emitted from an electron-emitting device on the RP. Then, the FP and the RP are opposed with each other to be separated by a spacer. A pressure between the FP and the RP is reduced to a pressure that is lower than atmosphere pressure (a vacuum).

As an electron-emitting device, a vertical field emission type electron-emitting device, having a cathode electrode and a gate electrode provided with an opening formed on a surface of a substrate in a vertical direction, may be considered. Then, as an opening shape of the gate electrode seen from the side of the FP, a slit-like (according to a typical example, a rectangular figure) opening and a hole-like (according to a typical example, a circular figure) opening may be considered.

As a vertical field emission type electron-emitting device having an electron beam convergent function, an example of an electron-emitting device having a cathode electrode provided with an electron-emitting portion and a gate electrode arranged on a surface of a substrate in a vertical direction at intervals, is disclosed in Japanese Patent Application Laid-Open No. 8-096703.

In addition, an example such that vertical field emission type electron-emitting devices are arranged in a matrix on an intersecting portion of a scanning wiring with a signal wiring is disclosed in JP-A No. 2003-151456.

DISCLOSURE OF INVENTION

In the case of the FED, in order to maintain an interval between the RP and the FP, a spacer may be disposed on a scanning wiring or on a signal wiring. Here, an electron beam emitted from an electron-emitting device is spread, so that the electron beam emitted from the electron-emitting device may be irradiated to the spacer. Then, various problems may be generated, for example, an orbit of an electron beam is changed because the spacer is charged up and an electron-emitting device breaks down because of a creeping discharge due to lowering of a creeping withstand voltage of the spacer.

There is a problem such that a high-definition FED cannot be realized if the electron-emitting devices are sparsely arranged in order to avoid such a problem.

The present invention has been made taking the foregoing problems into consideration and an object of which is to provide a technique to realize a high-definition field emission type display by reducing spread of an electron beam to be emitted from an electron-emitting device in the vicinity of a first wiring so as to prevent irradiation of the electron beam to a spacer arranged on the first wiring.

The present invention employs the following configuration, namely, the configuration comprising: a substrate; a first wiring that is arranged on the substrate; a second wiring that is arranged on the substrate and intersects with the first wiring; and an electron-emitting device having a cathode electrode provided with an electron-emitting member and a gate electrode arranged above the cathode electrode, which is arranged on the substrate and is separated from an intersecting portion of the first wiring with the second wiring; wherein the first wiring is arranged on the second wiring via an insulating layer; the gate electrode is provided with a plurality of slit-like openings that is arranged at intervals; and the opening is arranged so that an extended line in a longitudinal direction thereof intersects with the first wiring.

In addition, the present invention employs the following configuration, namely, the configuration comprising: a substrate; a first wiring that is arranged on the substrate; a second wiring that is arranged on the substrate and intersects with the first wiring; and an electron-emitting device having a cathode electrode provided with an electron-emitting member and a gate electrode arranged above the cathode electrode, which is arranged on the substrate and is separated from an intersecting portion of the first wiring with the second wiring; wherein the first wiring is arranged on the second wiring via an insulating layer; the gate electrode is provided with a plurality of slit-like openings that is arranged at intervals; and the slit-like opening is arranged so that one end portion in a longitudinal direction thereof near the first wiring rather than a center portion in a longitudinal direction.

According to the present invention, by reducing spread of an electron beam to be emitted from an electron-emitting device in the vicinity of a first wiring, it is possible to prevent irradiation of the electron beam to a spacer arranged on the first wiring, and further, it is possible to realize a high-definition field emission display.

Further features of the present invention will become apparent from the following description of exemplary embodiments with reference to the attached drawings.

BEST MODE FOR CARRYING OUT THE INVENTION

Figure 1A:
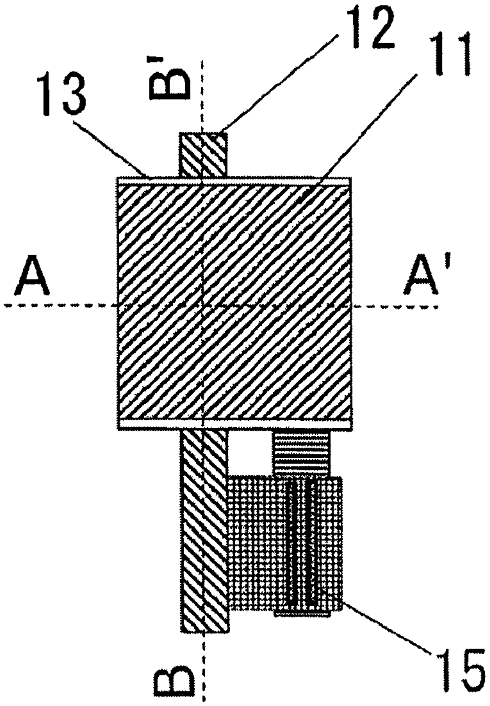
FIG. 1A is a plan view of an electron source according to an embodiment of the present invention.

Hereinafter, with reference to the drawings, preferable embodiments of this invention will be described with an example in detail. However, the scope of the present invention is not limited by its measurement, its material, its shape, and its relative arrangement or the like of a component part described in this embodiment unless there is a specific description.

In the electron source according to the present invention, electron-emitting devices are arranged so as to be separated from an intersecting portion of a first wiring that is a scanning wiring with a second wiring that is a signal wiring. As an electron-emitting device, a vertical field emission type electron-emitting device having an electron-emitting member and a gate electrode provided with slit-like openings formed on a substrate is applied. Then, the slit-like openings of the gate electrode are arranged so that a extended lines in a longitudinal direction thereof intersect with the first wiring. In other words, one end portion in a longitudinal direction of the slit-like opening is arranged near the first wiring rather than a center portion in a longitudinal direction.

In the vertical field emission type electron-emitting device having the slit-like opening, a convergent effect of an electron beam is different in a longitudinal direction and in a lateral direction of the slit-like opening.

Spread of the electron beam in the longitudinal direction of the slit-like opening is decided by an electron emitted from the vicinity of the end portion in the longitudinal direction of the slit-like opening. In the vicinity of the longitudinal-directional end portion of the slit-like opening, the gate electrode is arranged so as to surround an electron-emitting portion 180° or more, so that spread of the electron beam as if the electron is emitted from a vertical field emission type electron-emitting device having a hole-like opening is obtained.

On the other hand, spread of the electron beam in the lateral direction of the slit-like opening is decided by the electron emitted from the center portion in the longitudinal direction of the slit-like opening. In the vicinity of the center portion in the longitudinal direction of the slit-like opening, the electron-emitting portion is only sandwiched by two faces of the gate electrode being opposed with each other. Therefore, the vertical field emission type electron-emitting device having the slit-like opening has a smaller convergent effect of the electron beam due to the gate electrode than that of the vertical field emission type electron-emitting device having the hole-like opening. In other words, spread of the electron beam to be emitted from the vertical field emission type electron-emitting device having the slit-like opening is larger than spread of the electron beam to be emitted from the vertical field emission type electron-emitting device having the hole-like opening.

In consideration of a cross section of the opening of the vertical field emission type electron-emitting device, in the case of the same opening width (in the case of the hole-like opening, an opening diameter), spread of the electron beam to be emitted from the vertical field emission type electron-emitting device of the hole-like opening is smaller than spread of the electron beam to be emitted from the vertical field emission type electron-emitting device of the slit-like opening. Accordingly, the spread of the electron beam in the longitudinal direction of the slit-like opening is smaller than the spread of the electron beam in the lateral direction of the slit-like opening.

Particularly, in the case of the vertical field emission type electron-emitting device having an electron beam convergent function between the electron-emitting member and the gate electrode, the convergent effect very strongly works on the spread of the electron beam, so that the spread of the electron beam in the longitudinal direction of the slit-like opening is made smaller than the spread of the electron beam in the lateral direction of the slit-like opening. This is because that the convergent effect of the electron beam is large and the spread of the electron beam can be kept smaller, since a configuration having an electron beam convergent function between the electron-emitting portion and the gate electrode is arranged so as to surround the electron-emitting portion 180° C. or more. On the other hand, on the center portion in the longitudinal direction of the slit-like opening, the configuration having the electron beam convergent function between the electron-emitting portion and the gate electrode is only arranged so as to sandwich the electron-emitting portion by two faces being opposed to the electron-emitting portion, so that the convergent effect of the electron beam is made smaller since the portion to be surrounded by the configuration is smaller as compared to the convergent effect of the electron beam emitted from the vicinity of the end portion in the longitudinal direction of the slit-like opening. Accordingly, the spread of the electron beam emitted from the center portion in the longitudinal direction of the slit-like opening is made larger as compared to the spread of the electron beam emitted from the vicinity of the end portion in the longitudinal direction of the slit-like opening.

According to the present embodiment, by arranging the extended line in a longitudinal direction of the slit-like opening of the gate electrode so as to intersect with the first wiring on which the spacer is disposed, the end portion in the longitudinal direction of the slit-like opening is allowed to be arranged near the first wiring rather than the center portion in a longitudinal direction of the slit-like opening.

Thereby, in the vicinity of the spacer arranged on the first wiring, an electron is emitted from the end portion in the longitudinal direction of the slit-like opening having small spread of the electron beam. Therefore, according to the electron-emitting device having the slit-like opening, it is possible to make spread of the electron beam toward the spacer arranged on the first wiring smaller and it is possible to reduce the electron beam to be irradiated to the spacer. Thereby, the high-definition FED can be realized.

Figure 1C:
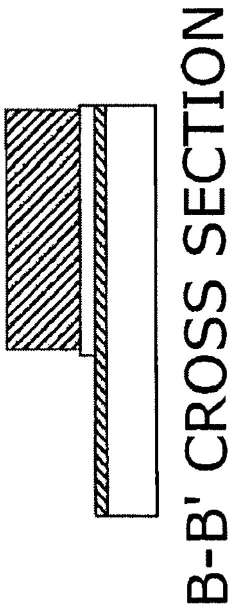
FIG. 1C is a cross sectional view taken on a line B-B' of FIG. 1A.
Figure 1B:
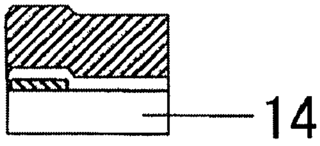
FIG. 1B is a cross sectional view taken on a line A-A' of FIG. 1A.

FIG. 1A is a schematic plan view of an electron source according to an embodiment of the present invention. Further, FIG. 1B is a cross sectional view taken on a line A-A' of FIG. 1A, and FIG. 1C is a cross sectional view taken on a line B-B' of FIG. 1A. In FIG. 1A, a first wiring 11 is elongated in a horizontal direction of a paper face, and in FIG. 1A, a second wiring 12 is elongated in a vertical direction of a paper face at a right angle to the first wiring 11 on a lower layer of the first wiring 11. An insulating layer 13 mediates between the second wiring 12 and the first wiring 11. On an insulating substrate 14, the first wiring 11 and the second wiring 12 are formed. An electron-emitting device 15 is arranged being separated from the region where the first wiring 11 and the second wiring 12 intersect with each other, an cathode electrode is connected to the first wiring 11, and a gate electrode is connected to the second wiring 12. The electron-emitting device 15 is provided with two slit-like openings that are arranged in a line at intervals.

Figure 2:
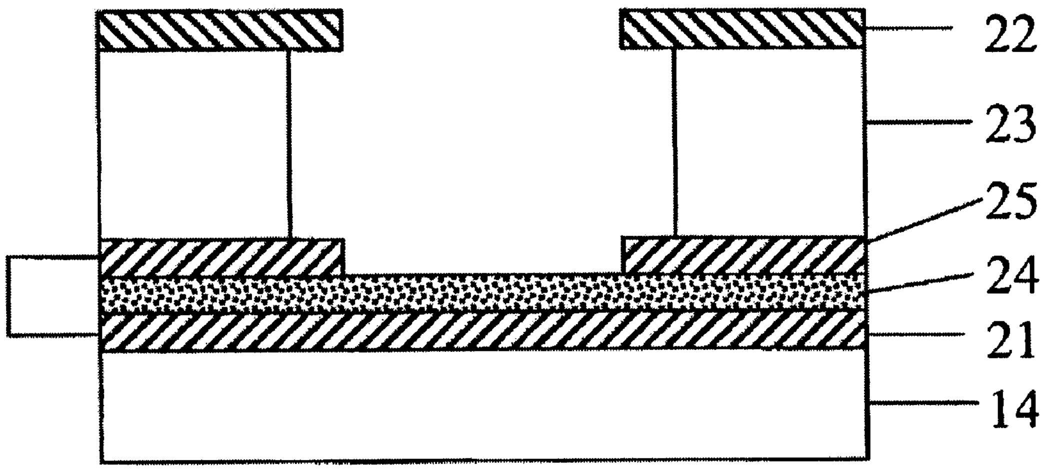
FIG. 2 is a cross sectional view showing an electron source according to the embodiment of the present invention.

FIG. 2 shows a cross section of the electron-emitting device 15 of FIG. 1A, and particularly, shows a cross section of one slit-like opening in the electron-emitting device 15. In FIG. 2, a cathode electrode 21 is formed on the insulating substrate 14 as a first layer to be connected to the first wiring 11. A gate electrode 22 is formed higher than the cathode electrode 21 as the highest layer of the insulating substrate 14 to be connected to the second wiring 12. An insulating layer 23 is formed lower than the gate electrode 22. An electron-emitting material 24 as an electron-emitting member is disposed on the cathode electrode 21. A focusing electrode 25 is disposed on the electron-emitting material 24 and the upper layer of this focusing electrode 25 is the insulating layer 23.

The focusing electrode 25 may be a part of the cathode electrode 21. Together with the cathode electrode 21, the focusing electrode 25 is connected to the first wiring 11.

Manufacturing methods of an electron source according to the present embodiment shown in FIGS. 1A to 1C and FIG. 2 will be descried with reference to FIGS. 3A to 3H. Further, each of FIGS. 3A to 3H is a schematic plan view in each step and only shows one pixel area.

(Step 1)

Figures 3A, 3B, 3C, 3D, 3E, 3F, 3G, 3H:
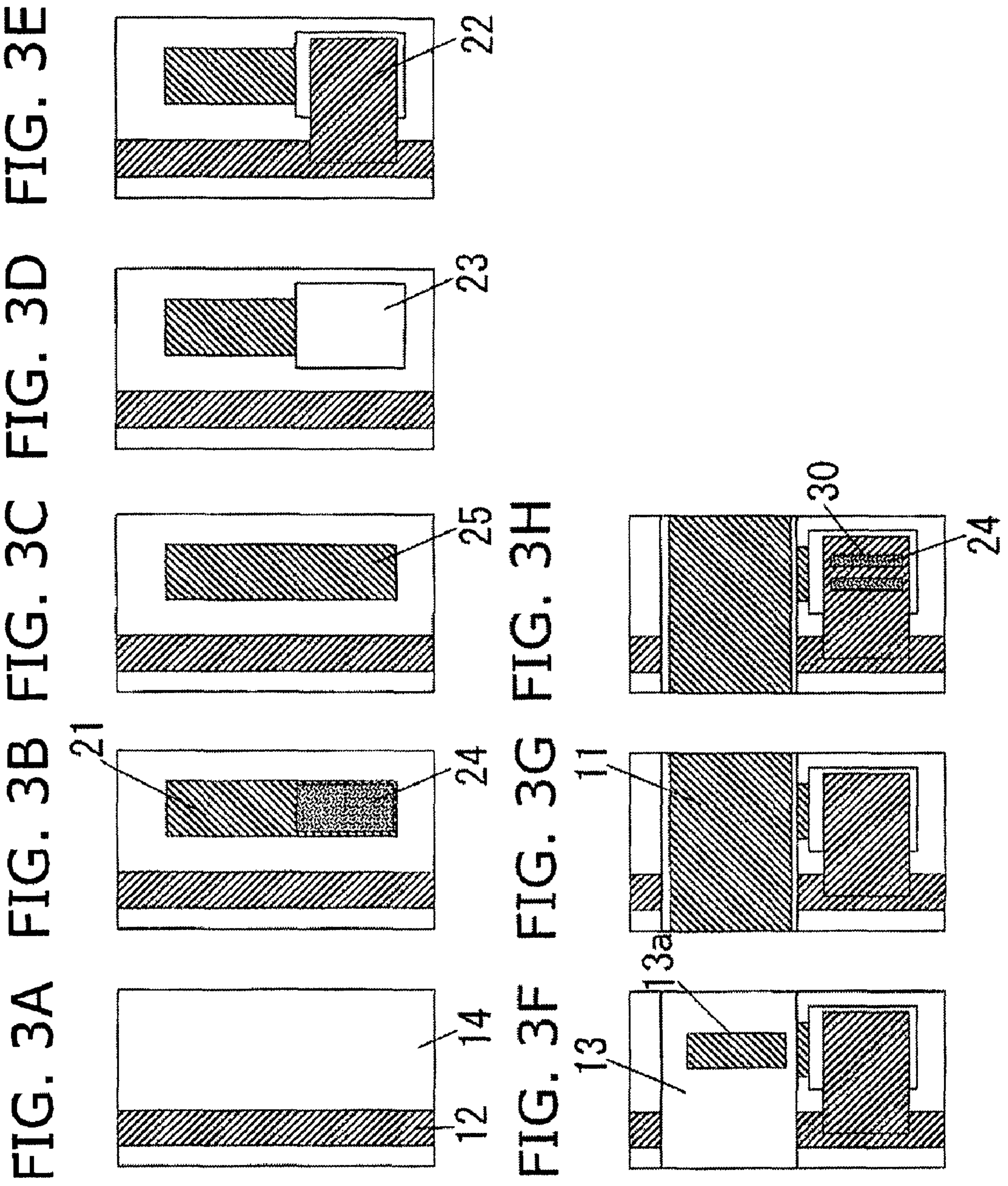
FIGS. 3A to 3H are views showing a manufacturing method of the electron source according to the embodiment of the present invention.

At first, on the insulating substrate 14 having a surface sufficiently cleaned, the second wiring 12 is arranged (FIG. 3A).

The second wiring 12 may be formed by a general vacuum deposition technology such as a vapor deposition method and a sputter method or may be formed by a printing technology. A method for forming the second wiring 12 may be appropriately selected by necessary a film thickness and a wiring width.

The insulating substrate 14 on which the second wiring 12 is formed may be appropriately selected from among a quartz glass, a glass having an impurity content such as Na reduced, a soda lime glass, a laminated body having $SiO_2$ formed on a silicon substrate or the like by a sputter method or the like, or an insulating ceramic substrate such as aluminum oxide.

(Step 2)

Subsequently, the cathode electrode 21 is arranged at the side of the second wiring 12 and the cathode electrode 21 is separated from the second wiring 12. Then, the electron-emitting material 24 is formed on the cathode electrode (FIG. 3B).

The size (of land) of the cathode electrode 21 and the size of the electron-emitting material 24 may be the same or may be different. In the case of forming a focusing electrode 25 formed in Step 3 (FIG. 3C) also in the area where the first wiring 11 is formed in Step 7 (FIG. 3G), the cathode electrode 21 and the electron-emitting material 24 may not be formed in the area where the first wiring 11 is formed. In addition, if a cathode electrode function for injecting an electron in the electron-emitting material 24 is given to the focusing electrode 25 to be formed in Step 3, a step for forming the cathode electrode 21 may be omitted in the present step 2.

The cathode electrode 21 is formed by a general vacuum deposition technology such as a CVD method, a vapor deposition method, and a sputter method. For example, the material of the cathode electrode 21 may be appropriately selected from among a metal or an alloy material such as Be, Mg, Ti, Zr, Hf, V, Nb, Ta, Mo, W, Al, Cu, Ni, Cr, Au, Pt, and Pd, a carbide such as TiC, ZrC, HfC, Tac, Sic, and WC, a boride such as $HfB_2$, $ZrB_2$, $LaB_6$, $CeB_6$, $YB_4$, and $GdB_4$, a nitride such as TiN, ZrN, and HfN, and a semiconductor or the like such as Si and Ge. The thickness of the cathode electrode 21 is defined in the range of several tens nm to several mm, and preferably, the thickness of the cathode electrode 21 is selected in the range of several tens nm to several μm.

The electron-emitting material 24 is formed by a general vacuum deposition technology such as a CVD method, a vapor deposition method, and a sputter method or a technology for dissolving an organic solvent by heat. The material for composing the electron-emitting material 24 will be appropriately selected from among graphite, fullerene, a fiber-like conductive material (including a carbon fiber such as a carbon nano-tube), an amorphous carbon, a diamond-like carbon, and a carbon and a carbon composition having a diamond dispersed, for example. Preferably, a carbon composition having a low work function is employed. A film thickness of the electron-emitting material 24 is defined in the range not more than several μm, and preferably, the film thickness of the electron-emitting material 24 is selected in the range not more than 150 nm.

(Step 3)

Subsequently, the focusing electrode 25 is formed on the cathode electrode 21 and the electron-emitting material 24 (FIG. 3C).

The focusing electrode 25 is formed by a general vacuum deposition technology such as a CVD method, a vapor deposition method, and a sputter method. The material of the focusing electrode 25 may be the same as the material of the cathode electrode 21 or a different material may be used. In addition, upon forming the focusing electrode 25, the same vacuum deposition technology as that used for forming the cathode electrode 21 may be used or a different vacuum deposition technology may be used.

In addition, the lengths of the cathode electrode 21, the electron-emitting material 24, and the focusing electrode 25 in a direction in parallel with the longitudinal direction of the second wiring 12 may be formed so as to be the same with each other or may be differently formed. However, at least one of the cathode electrode 21, the electron-emitting material 24, and the focusing electrode 25 should reach the area where the first wiring is formed.

(Step 4)

Subsequently, the insulating layer 23 is formed on the area where the electron-emitting device is formed (FIG. 3D).

The insulating layer 23 may be formed by using any method if it can be arranged on a desired area. As an example, for example, masking the area where the electron-emitting device is formed except for the portion where the insulating layer 23 is arranged, the insulating layer 23 can be formed by a general vacuum deposition technology such as a CVD method, a vapor deposition method, a sputter method, and a plasma method. Alternatively, by using a printing method such as an inkjet system, the insulating layer 23 can be arranged only on a desired area.

The insulating layer 23 is formed by a general vacuum deposition technology such as a sputter method, a CVD method, and a vapor deposition method. The material of the insulating layer 23 will be appropriately selected from among $SiO_2$, SiN, $Al_2O_3$, $Ta_2O_5$, and CaF or the like. As the material of the insulating layer 23, a material that can be stand up to a high electric field (namely, a material having high voltage tightness) is desirable. A film thickness of the insulating layer 23 is defined in the range of several tens nm to several μm, and preferably, the film thickness of the insulating layer 23 is selected in the range of several hundreds nm to several μm.

(Step 5)

Subsequently, the gate electrode 22 is formed on the area where the electron-emitting device is formed so as to be connected to the second wiring formed in Step 1 (FIG. 3E).

The material of the gate electrode 22 may be the same as the material of the cathode electrode 21 or the material of the focusing electrode 25 described in Step 2 or it may be different material. In addition, the gate electrode 22 may be formed by using the same method as the method for forming the cathode electrode 21 or the method for forming the focusing electrode 25 or the gate electrode 22 may be formed by using a different method.

(Step 6)

Subsequently, the insulating layer 13 having a contact hole 13*a* is formed on the area where the first wiring is formed (FIG. 3F).

The contact hole 13*a* is a square hole and the contact hole 13*a* serves to joint the first wiring 11, the cathode electrode 21, the electron-emitting material 24, and the focusing electrode 25.

The insulating layer 13 is formed by a general vacuum deposition technology such as a CVD method, a vapor deposition method, and a sputter method or a printing technology. A thickness and a width of a film necessary for the insulating layer 13 will be appropriately selected depending on a dielectric constant of the insulating layer 13.

(Step 7)

Subsequently, the first wiring 11 is formed (FIG. 3G).

The first wiring 11 may be formed by a general vacuum deposition technology such as a vapor deposition method and a sputter method or may be formed by a printing technology. The first wiring 11 may be formed by the same method as the method for forming the second wiring 12 or may be formed by a different method. In addition, the material of the first wiring 11 may be the same as that of the second wiring 12 or may be a different material. The method for forming the first wiring 11 and the material of the first wiring 11 will be appropriately selected depending on a necessary thickness of the film and a necessary width of the wiring.

(Step 8)

Finally, a slit-like opening 30 is formed on the area where the electron-emitting device is formed so that the surface of the electron-emitting material 24 is exposed (FIG. 3H). Through the above-described steps, an electron source of the present embodiment is completed.

In this case, the slit-like opening 30 is formed so that the extended line in a longitudinal direction of the slit-like opening 30 intersects with the first wiring 11 or the end portion in the longitudinal direction of the slit-like opening 30 is allowed to be arranged near the first wiring 11 rather than the center portion in a longitudinal direction of the slit-like opening 30.

Further, in FIG. 3H, the number of the slit-like openings 30 is two, however, the number of the openings 30 will be appropriately decided depending on the work function of the electron-emitting material 24, a voltage upon driving the electron source, and a shape of an electron beam to be required or the like. In addition, a distance between the opposite gate electrodes 22 (the opening diameter) will be appropriately decided depending on a distance between the materials to form the electron-emitting device, a work function of the electron-emitting material 24, a voltage upon driving the electron source, and a shape of an electron beam to be required or the like. Normally, the depth of the slit-like opening 30 is defined in the range of several tens nm to several tens μm, and preferably, it is selected in the range of not less than 100 nm and not more than 10 μm. Further, the slit-like opening 30 can be made into the rectangular opening 30. Then, in this case, the length of a long side of the rectangular opening 30 is at least twice or more than the length of the short side practically, and preferably, it is five times or more than the length of the short side.

The slit-like opening 30 is formed so as to penetrate the gate electrode 22, the insulating layer 23, and the focusing electrode 25. The opening 30 is formed by etching. The method of etching may be appropriately selected in response to the materials of the gate electrode 22, the insulating layer 23, and the focusing electrode 25 that are targets for etching.

Next, an application example of an electron source according to the embodiments of the present invention will be described below. By arranging a plurality of electron sources according to the embodiments of the present invention on a substrate, for example, an image display apparatus can be formed.

Figure 4:
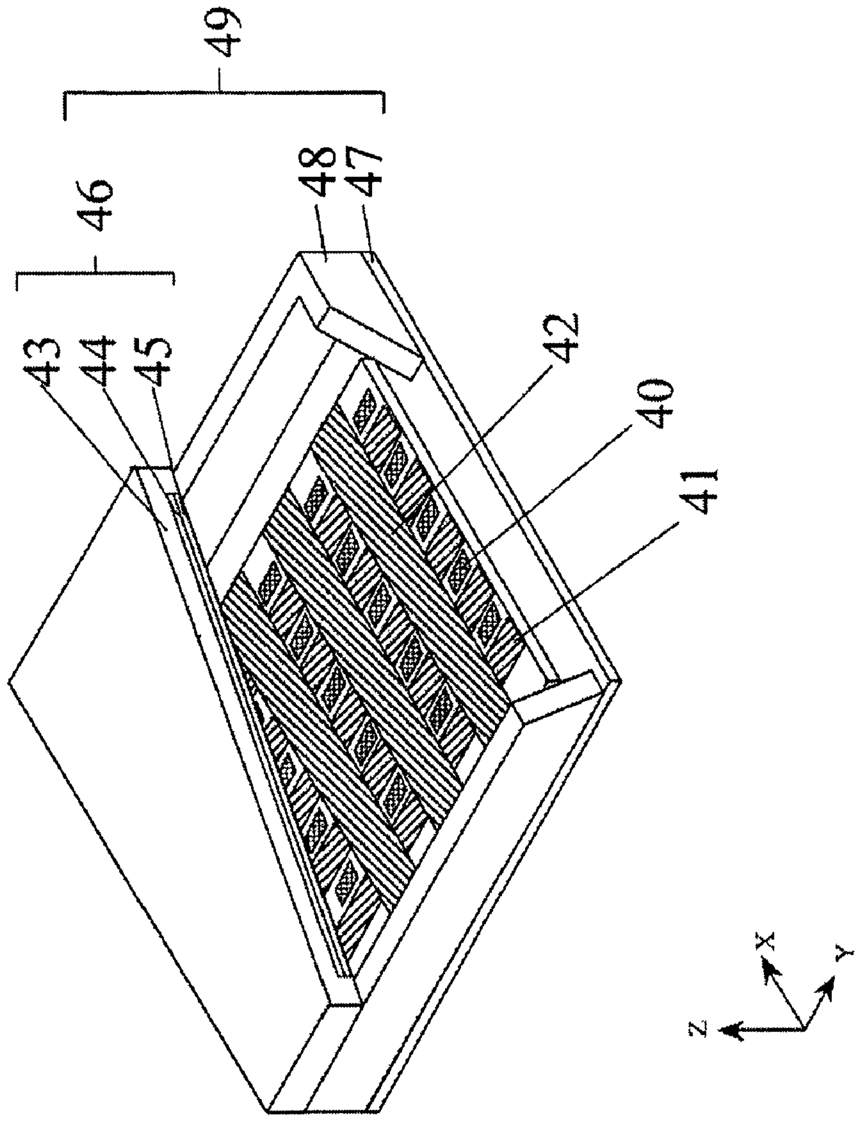
FIG. 4 is a view showing a configuration of an image display apparatus according to the embodiment of the present invention.

With reference to FIG. 4, the image display apparatus that is obtained by using the electron source according to the present embodiment will be described below.

A second wiring 41 and a first wiring 42 intersect with each other. An electron-emitting device 40 is arranged on an intersecting portion of the second wiring 41 with the first wiring 42 being separated from the second wiring 41 and the first wiring 42. A face plate 46 is formed by a glass substrate 43, a fluorescent film 44 that is a light-emitting member, and a metal back 45. On an electron source substrate 47, a plurality of electron-emitting devices 40 is arranged. A support frame 48 supports the face plate 46 and the electron source substrate 47 with intervening there between. An external package 49 is formed by the face plate 46, the electron source substrate 47, and the support frame 48.

The second wiring 41 and the first wiring 42 can have a function as a row directional wiring and a column directional wiring, respectively, however, the second wiring 41 and the first wiring 42 may be connected to the row directional wiring and the column directional wiring, respectively. The face plate 46 is jointed to the support frame 48 by using a flit glass having a low melting point or the like.

In addition, by arranging at least one support body (not illustrated) that is referred to as a spacer between the face plate 46 and the electron source substrate 47, the external package 49 having a sufficient intensity against an atmosphere pressure can be configured. In the case that the external package 49 is large, for example, a plurality of platy spacers is arranged on the first wiring 42 in order to obtain a sufficient intensity.

As described above, the image display apparatus is configured by the electron-emitting device 40 arranged on the electron source substrate 47, the second wiring 41, the first wiring 42, and the external package 49.

Figure 5:
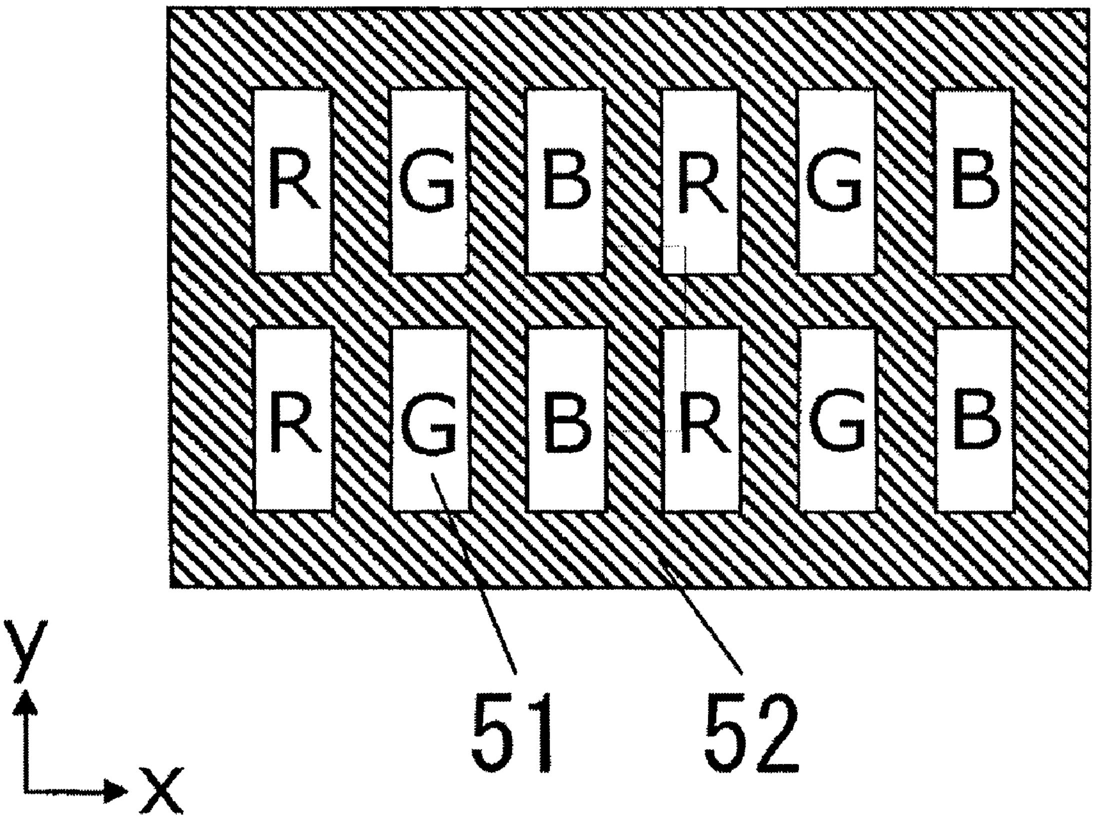
FIG. 5 is a view showing a configuration of a fluorescent film of the image display apparatus according to the embodiment of the present invention.

FIG. 5 schematically shows a part of the fluorescent film 44. By regularly arranging a phosphor 51 corresponding to an emission color to be displayed and flashing a desired phosphor 51, an image can be displayed on the outer face of the glass substrate 43. The phosphor 51 is partitioned by a light absorption member 52. An object of arranging the light absorption member 52 is to efface a mixed color or the like of each phosphor 51 corresponding to three primary colors that are required in a color display and to prevent degradation of a contrast or the like. For example, the phosphor 51 is arranged in the order of R (red), G (green), and B (blue) in an x direction, and the same color phosphor 51 is arranged in a y direction. The area where such a fluorescent film 44 is arranged becomes a screen of the image display apparatus.

Figure 6:
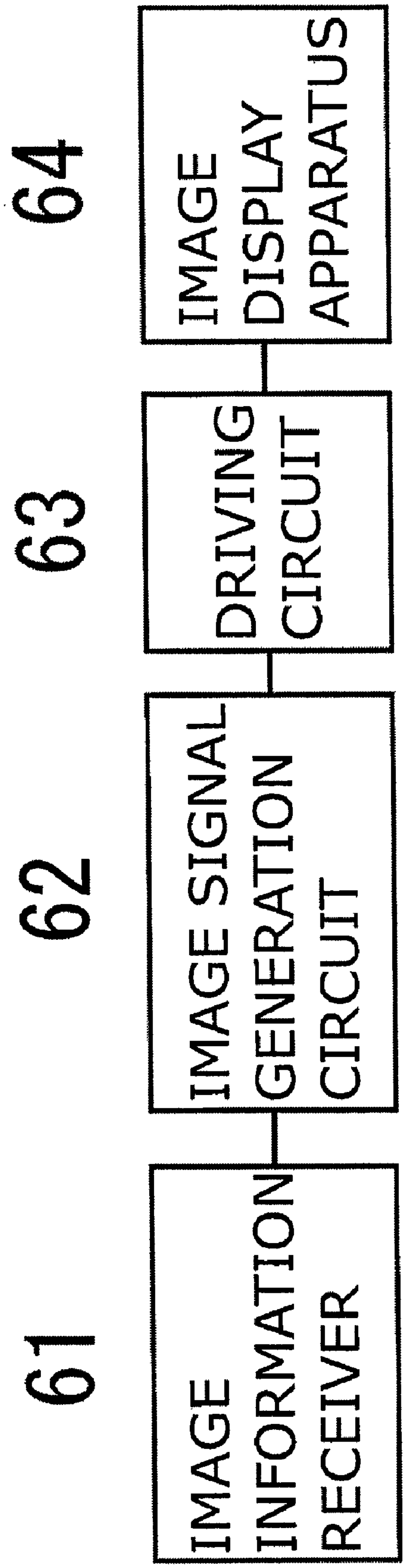
FIG. 6 is a view showing a configuration of an image receiving display apparatus using an electron-emitting device according to the embodiment of the present invention.

An image receiving display apparatus as the information display reproducing apparatus according to the present embodiment is schematically shown in FIG. 6. The configuration of the image receiving display apparatus according to the present embodiment includes the image display apparatus having a screen schematically shown in FIG. 4. In FIG. 6, the image receiving display apparatus is configured by an image information receiver 61 as a receiver, an image signal generation circuit 62, a driving circuit 63, and an image display apparatus 64.

At first, the image information receiver 61 outputs image information included in the received broadcast signal. The outputted image information is inputted in the image signal generation circuit 62 and an image signal is generated. As the image information receiver 61, for example, a receiver such as a tuner which can tune and receive a radio broadcast, a cable broadcast, and a video broadcast via Internet or the like may be considered. The image information receiver 61 can receive not only the image information but also the character information and the voice information. Further, the image information receiver 61, a TV set can configured together with the image signal generation circuit 62, the driving circuit 63, and the image display apparatus 64. The image signal generation circuit 62 generates an image signal corresponding to each pixel of the image display apparatus 64 from the image information. The generated image signal is inputted in the driving circuit 63. The driving circuit 63 controls a voltage to be applied to the image display apparatus 64 on the basis of the inputted image signal and displays an image on a screen of the image display apparatus Further, the present invention is not limited to the above-described embodiment and each constituent element may be substituted with a substitute and an equivalent if it achieves the object of the present invention.

First Embodiment

Figures 7A, 7B, 7C, 7D, 7E, 7F, 7G, 7H, 7I, 7J:
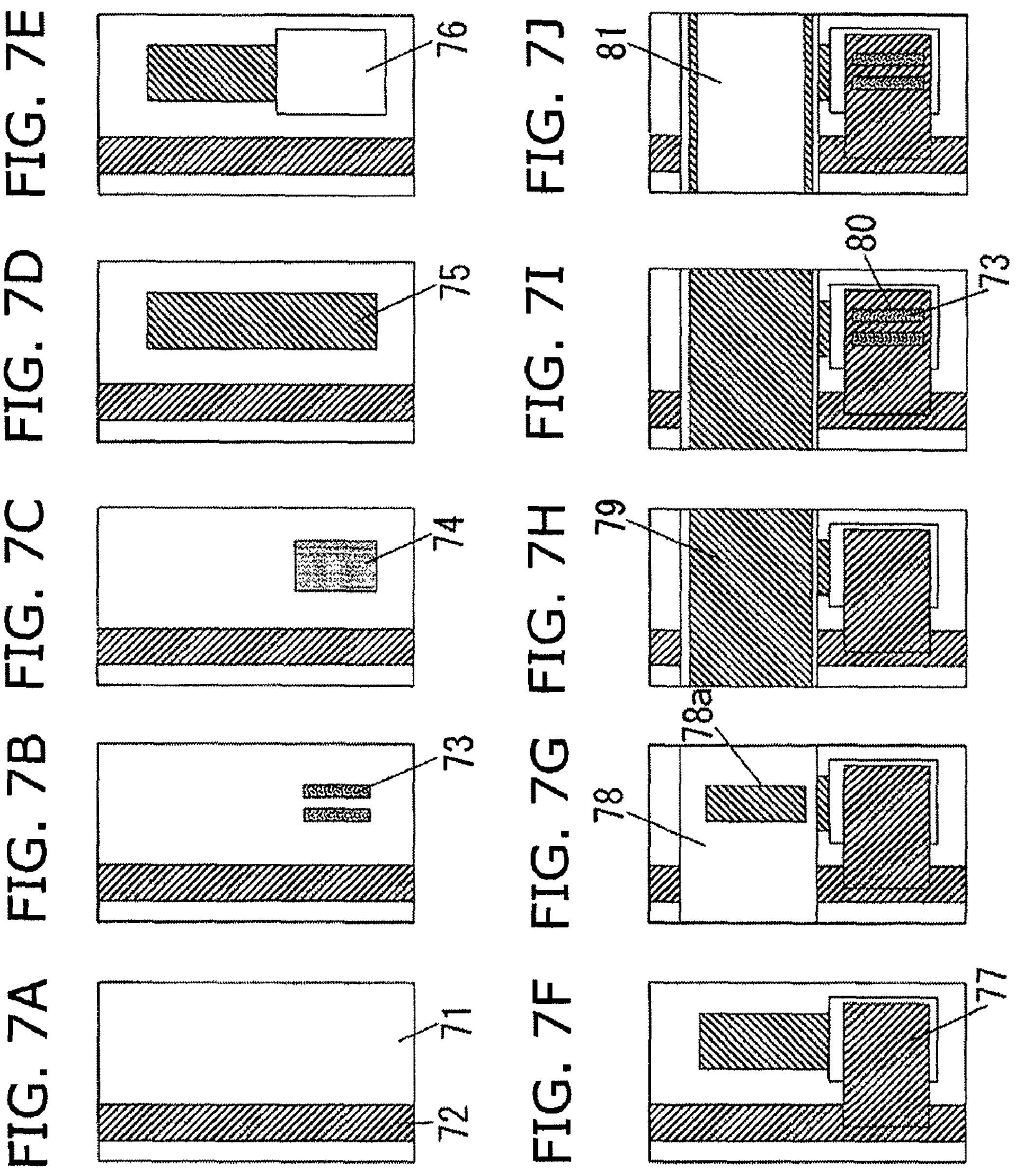
FIGS. 7A to 7J are views showing a manufacturing method of an electron source according to a first embodiment of the present invention.
Figure 8:
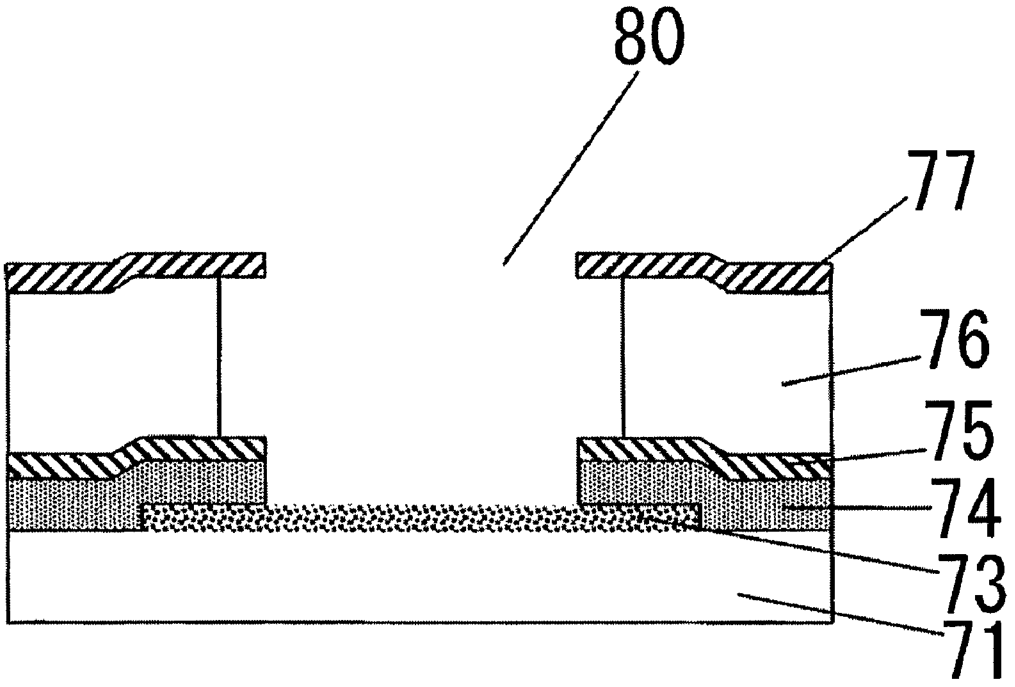
FIG. 8 is a view showing a cross section in a lateral direction of one opening shaped in a slit of an electron-emitting device according to the first embodiment of the present invention.

FIG. 7I shows a schematic plan view of an electron source that is manufactured according to the present embodiment. FIG. 8 shows a schematic cross section in a lateral direction of a slit-like opening of an electron-emitting device according to the present embodiment. FIGS. 7A to 7J show a manufacturing method of the electron source according to the present embodiment. Hereinafter, a manufacturing step of the electron source according to the present embodiment will be described in detail.

(Step 1)

At first, on a quartz substrate 71, of which surface is sufficiently cleaned, Cu having a thickness 3 μm and a width 50 μm is formed as a signal wiring 72 by a printing method (FIG. 7A).

(Step 2)

Subsequently, a pattern for lift-off is formed by a photoresist, and on the side of the signal wiring 72, a slit-like amorphous carbon film having a thickness 30 nm is formed as an electron-emitting film 73 (FIG. 7B). The electron-emitting film 73 is formed by using a plasma CVD method.

The width of the slit-like electron-emitting film 73 (in the lateral direction) is defined to be 5 μm and the length thereof (in the longitudinal direction) is defined to be 85 μm.

(Step 3)

Subsequently, a pattern for lift-off is formed by a photoresist, and a mixed film composed of SiOxNy (x=1 to 2, y=0 to 1) and Al, having a thickness 100 nm, is formed as a resistance layer 74 so as to cover the electron-emitting film 73 (FIG. 7C). The resistance layer 74 is formed by using a co-spatter method.

(Step 4)

Subsequently, a pattern for lift-off is formed by a photoresist, and TiN having a thickness 100 nm is formed by spattering as a convergent and cathode electrode 75. The convergent and cathode electrode 75 is formed so as to overlap with an area where a scanning wiring 79 is formed in Step 8 (FIG. 7D).

(Step 5)

Subsequently, a pattern for lift-off is formed by a photoresist, and $SiO_2$ having a thickness 1 μm is formed as an insulating layer 76 on the area where the electron-emitting device is formed (FIG. 7E). The insulating layer 76 is formed by using a spatter method.

(Step 6)

Subsequently, a pattern for lift-off is formed by a photoresist, and TiN having a thickness 100 nm is formed as a gate electrode 77 on the area where the electron-emitting device is formed and the area of the signal wiring 72 (FIG. 7F). The gate electrode 77 is formed by using a spatter method.

(Step 7)

Subsequently, using a mask, $SiO_2$ having a thickness 5 μm and a width 210 μm is formed as an insulating layer 78 having a contact hole **78*a* so as to contact a scanning wiring 79 to the convergent and cathode electrode 75 (FIG. 7G). The insulating layer 78 having the contact hole 78*a*** is formed by using a printing technology.

(Step 8)

Subsequently, by using a mask, Ag having a thickness 13 μm and a width 200 μm is formed as the scanning wiring 79 is formed on the insulating layer 78 (FIG. 7H). The scanning wiring 79 is formed by using a printing method.

By providing the contact hole **78*a* formed in Step 7, the scanning wiring 79 is allowed to electrically contact the convergent and cathode electrode 75**.

(Step 9)

Finally, a pattern for lift-off is formed by a photoresist, and a rectangular opening is formed as a slit-like opening 80 on the area where the electron-emitting device is formed (FIG. 7I). The slit-like opening 80 is formed by using an etching technology. Through the above-described steps, the electron source according to the present embodiment is completed. The slit-like opening 80 is formed so that the extended line in the longitudinal direction of the slit-like opening 80 is at a right angle to the scanning wiring 79.

Etching in Step 9 is carried out so that the electron-emitting film 73 is exposed. The gate electrode 77 is etched by dry etching using $BCl_3$. The insulating layer 76 is etched by dry etching using $CF_4$. The convergent and cathode electrode 75 is etched by dry etching using $BCl_3$. Then, the resistance layer 74 is etched by wet etching using BHF. Due to these etching, the surface of the electron-emitting film 73 is exposed. Due to wet etching by BHF, the insulating layer 76 is also etched a little.

According to the present embodiment, by disposing the resistance layer 74 between the electron-emitting film 73 and the convergent and cathode electrode 75, as compared to an electron-emitting device with a focusing electrode and a cathode electrode electrically connected like the electron-emitting device shown in FIG. 2 (namely, an electron-emitting device such that the potential of the focusing electrode is equal to the potential of the cathode electrode), fluctuation of emission of electrons can be reduced.

In the electron-emitting device according to the present embodiment, when the electron is injected in the electron-emitting film 73, the electron necessarily passes through the resistance layer 74. Therefore, in accordance with change of the current amount flowing through the resistance layer 74, a voltage drop generated in the resistance layer 74 is changed. If the voltage drop is changed, a potential difference is generated between the convergent and cathode electrode 75 and the electron-emitting film 73. As a result, an intensity of an electric field to be applied to the electron-emitting film 73 is changed, so that the current amount to be emitted from the electron-emitting film 73 is also changed.

Specifically, if the electron is emitted from the electron-emitting film 73, in accordance with the current amount, the voltage drop occurs in the resistance layer 74, so that the potential of the electron-emitting film 73 is slightly higher than that of the convergent and cathode electrode 75. If current amount to be emitted from the electron-emitting film 73 is increased, a potential difference between the convergent and cathode electrode 75 and the electron-emitting film 73 is increased, so that an intensity of an electric field to be applied to the electron-emitting film 73 is weakened. As a result, the current amount to be emitted from the electron-emitting film 73 is reduced. On the other hand, if the current amount to be emitted from the electron-emitting film 73 is reduced, a potential difference between the convergent and cathode electrode 75 and the electron-emitting film 73 is decreased, so that an intensity of an electric field to be applied to the electron-emitting film 73 is intensified. As a result, the current amount to be emitted from the electron-emitting film 73 is increased. Due to occurring of such a phenomenon, according to the electron-emitting device of the present embodiment, it is possible to stabilize the current amount to be emitted from the electron-emitting film 73 and to reduce fluctuation of emission of electrons.

In addition, in the electron source of the present embodiment, since the electron-emitting material portion is separated for each slit-like opening 80 (FIG. 7B), the current amount to be injected passing through the resistance layer 74 formed thereon is limited for each slit-like opening 80. As a result, dispersion in fluctuation of emission of electrons between the slit-like openings 80 is reduced.

In addition, since the electron source according to the present embodiment is provided with the resistance layer 74 for each electron source (FIG. 7C), in the case that a plurality of electron sources according to the present embodiment is arranged in a matrix, dispersion in fluctuation of emission of electrons between respective electron sources is reduced so as to be capable of providing a beautiful image.

Figure 9:
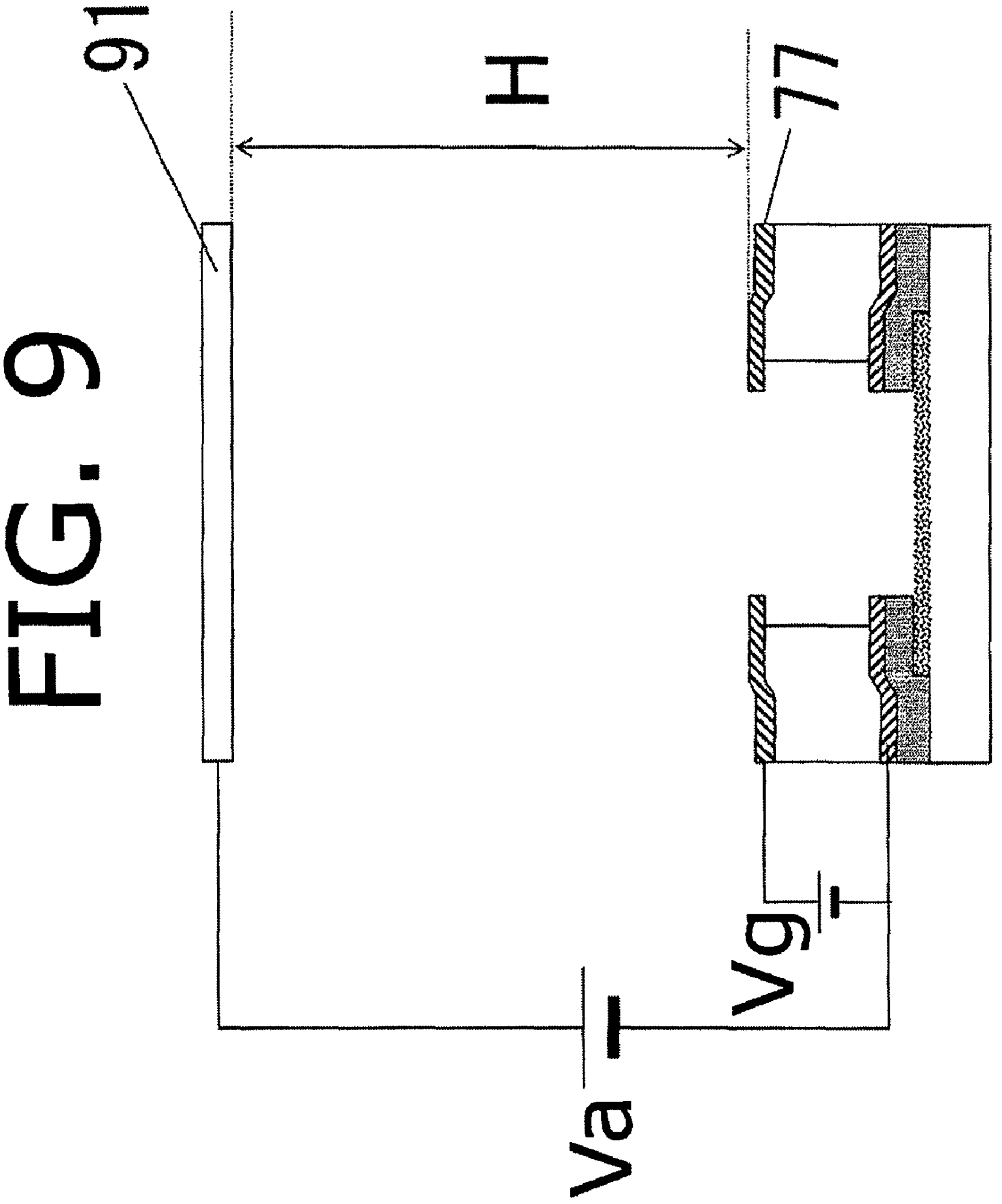
FIG. 9 is a view showing a constitutional example when the electron source according to the first embodiment of the present invention is operated.

A spacer 81 having a thickness 1.6 mm and a width 200 μm is arranged on the scanning wiring 79 of the electron source according to the present embodiment (FIG. 7J). Further, an FP having the phosphor arranged is arranged thereon, and the electron beam emitted from the electron source is observed. A schematic view of a configuration for driving the electron source is shown in FIG. 9. A voltage Va=10 kV is applied to an FP 91 and a voltage Vg=20V is applied to the gate electrode 77, and the electron beam is observed. For comparison, an electron source such that a shape of an opening and a distance from the spacer to the opening are the same as those of the electron source according to the present embodiment and the extended line in a longitudinal direction of the slit-like opening is in substantially parallel with the scanning wiring (the extended line does not intersect with the scanning wiring) is also manufactured. Comparing the electron source according to the present embodiment with the electron source according to a comparison example, deviation of a position of the electron beam in the electron source according to the present embodiment is largely improved as compared to the comparison example.

Second Embodiment

Figures 10A, 10B, 10C, 10D, 10E, 10F, 10G, 10H, 10I, 10J:
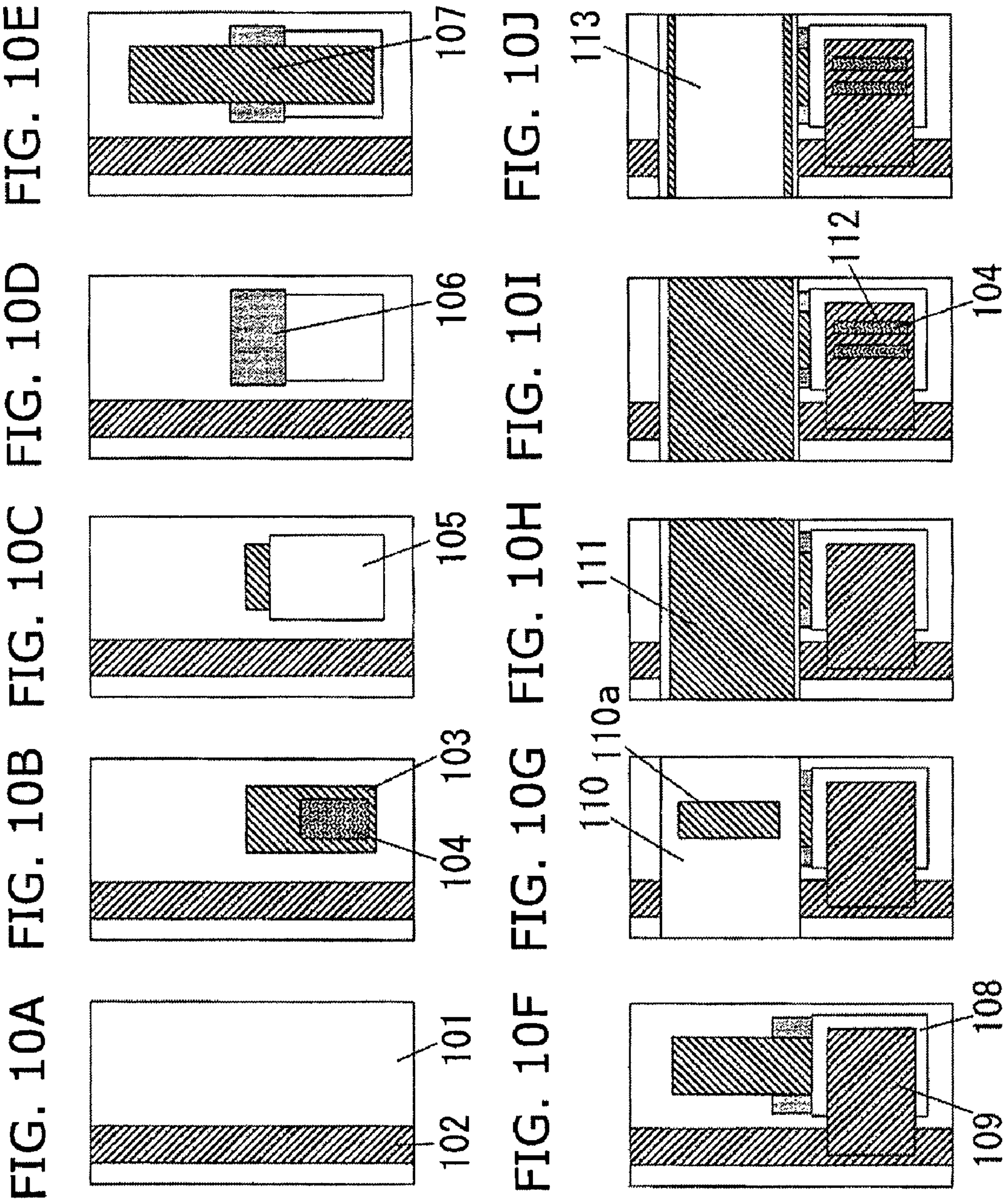
FIGS. 10A to 10J are views showing a manufacturing method of an electron source according to a second embodiment of the present invention.
Figure 11:
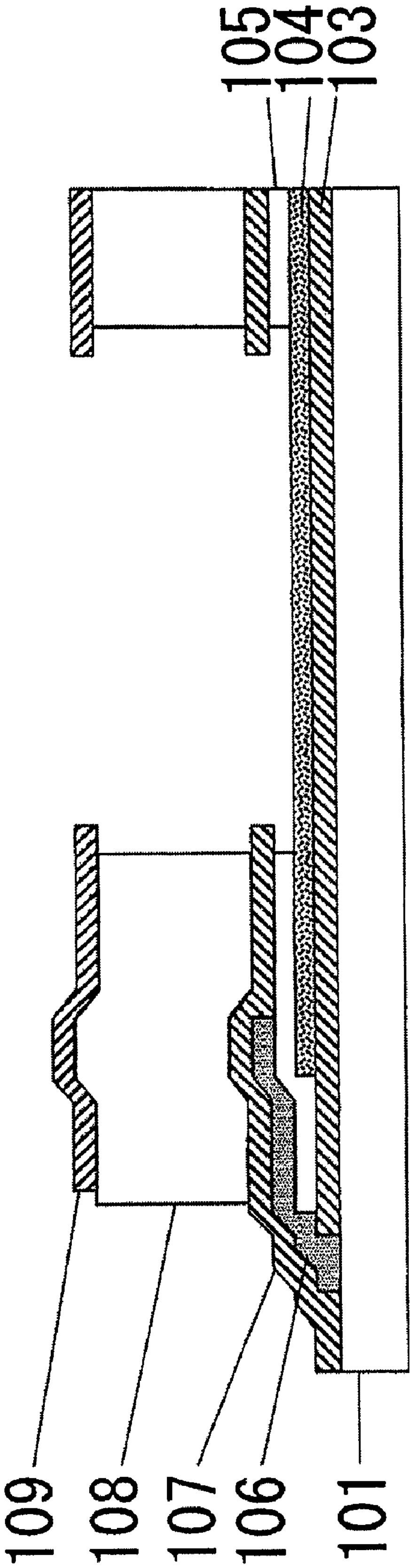
FIG. 11 is a view showing a cross section in a longitudinal direction of one opening shaped in a slit of an electron-emitting device according to the second embodiment of the present invention.

FIG. 10I shows a schematic plan view of an electron source that is manufactured according to the present embodiment. FIG. 11 shows a schematic cross section in a longitudinal direction of a slit-like opening of an electron-emitting device according to the present embodiment. FIGS. 10A to 10J show a manufacturing method of the electron source according to the present embodiment. Hereinafter, a manufacturing step of the electron source according to the present embodiment will be described in detail. The explanation about the parts overlapped with the first embodiment is herein omitted.

(Step 1)

At first, on a quartz substrate 101, of which surface is sufficiently cleaned, Cu having a thickness 3 μm and a width 50 μm is formed by a printing method so as to form a signal wiring 102 (FIG. 10A).

(Step 2)

Subsequently, a pattern for lift-off is formed by a photoresist, and on the side of the signal wiring 102, TiN having a thickness 300 nm is formed as a cathode electrode 103 by a spatter method. On the cathode electrode 103, a pattern for lift-off is formed by a photoresist, and as an electron-emitting film 104, an amorphous carbon film having a thickness 30 nm is formed by a plasma CVD method (FIG. 10B).

(Step 3)

Subsequently, a pattern for lift-off is formed by a photoresist, and $SiO_2$ having a thickness 100 nm is formed as an insulating layer 105 by a spatter method so as to cover the electron-emitting film 104 (FIG. 10C).

(Step 4)

Subsequently, a pattern for lift-off is formed by a photoresist, and a mixed film composed of $SiO_xN_y$ (x=1 to 2, y=0 to 1) and Al, having a thickness 100 nm, is formed as a resistance layer 106 so as to cover the cathode electrode 103 disposed on the portion that is not covered with the insulating layer 105 by using a co-spatter method (FIG. 10D).

(Step 5)

Subsequently, a pattern for lift-off is formed by a photoresist, and TiN having a thickness 100 nm is formed by a spatter method as a focusing electrode 107. The focusing electrode 107 is formed so as to be overlapped with the area where a scanning wiring 111 is formed in Step 8 (FIG. 10E)

(Step 6)

Subsequently, a pattern for lift-off is formed by a photoresist, and $SiO_2$ having a thickness 1 μm is formed as an insulating layer 108 by a spatter method on the area where the electron-emitting device is formed. Then, a pattern for lift-off is formed by a photoresist, and TiN having a thickness 100 nm is formed by a spatter method as a gate electrode 109 on the area where the electron-emitting device is formed and the area of the signal wiring 102 (FIG. 10F).

(Step 7)

Subsequently, by using a mask, $SiO_2$ having a thickness 5 μm and a width 210 μm is formed as an insulating layer 110 by a printing technology as an insulating layer 110 having a contact hole 110*a* so as to contact a scanning wiring 111 and the focusing electrode 107 (FIG. 10G).

(Step 8)

Subsequently, by using a mask, Ag having a thickness 13 μm and a width 200 pin is formed as the scanning wiring 111 by a printing technology on the insulating layer 110 (FIG. 10H). By providing the contact hole 110*a* of the insulating layer 110 that is formed in Step 7, the scanning wiring 111 is allowed to electrically contact the focusing electrode 107.

(Step 9)

Finally, a pattern for lift-off is formed by a photoresist, and a rectangular opening is formed as a slit-like opening 112 on the area where the electron-emitting device is formed by an etching technology (FIG. 10I). Through the above-described steps, an electron source according to the present embodiment is completed. The slit-like opening 112 is formed so that the extended line in the longitudinal direction of the slit-like opening 112 is at a right angle to the scanning wiring 111. The method of etching is the same as the first embodiment.

According to the present embodiment, by disposing the resistance layer 106 between the focusing electrode 107 and the cathode electrode 103, all of the electrons to be provided to the electron-emitting film 104 will be routed through the resistance layer 106. As a result, according to the present embodiment, due to the resistance layer 106 disposed between the focusing electrode 107 and the cathode electrode 103, the same effect as the first embodiment can be obtained so that fluctuation of emission of electrons can be reduced.

In addition, as same as the electron source as the first embodiment, since the electron source according to the present embodiment is provided with the resistance layer 106 for each electron source (FIG. 10D), in the case that a plurality of the electron sources according to the present embodiment is arranged in a matrix, dispersion in fluctuation of emission of electrons between respective electron sources is reduced so as to be capable of providing a beautiful image.

As same as the first embodiment, on the scanning wiring 111 of the electron source according to the present embodiment, a spacer 113 having a thickness 1.6 mm and a width 200 μm is arranged (FIG. 10J). Further, the FP having the phosphor arranged is arranged thereon, and the electron beam emitted from the electron source is observed. For comparison, an electron source such that a shape of an opening and a distance from the spacer to the opening are the same as those of the electron source according to the present embodiment and the extended line in a longitudinal direction of the slit-like opening is in substantially parallel with the scanning wiring (the extended line does not intersect with the scanning wiring) is also manufactured. Comparing the electron source according to the present embodiment with the electron source according to a comparison example, deviation of a position of the electron beam in the electron source according to the present embodiment is largely improved as compared to the comparison example.

Third Embodiment

Figures 12A, 12B, 12C, 12D, 12E, 12F, 12G, 12H, 12I, 12J:
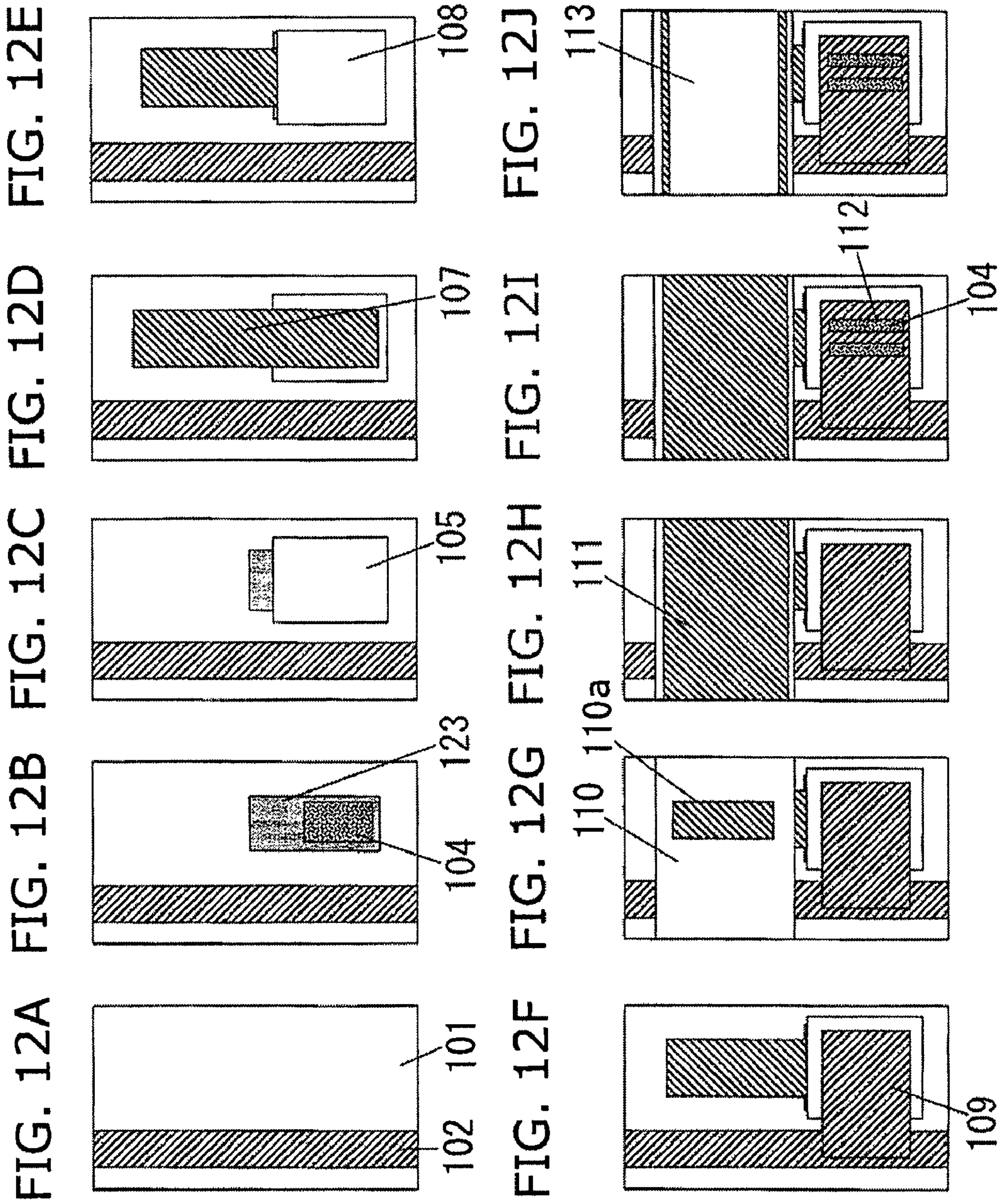
FIGS. 12A to 12J are views showing a manufacturing method of an electron source according to a third embodiment of the present invention.
Figure 13:
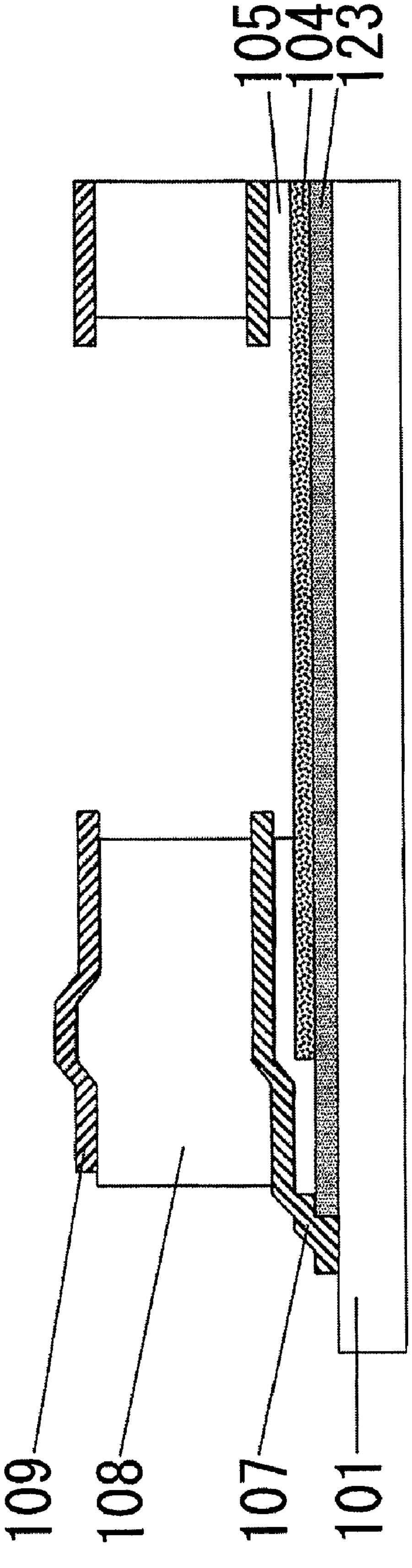
FIG. 13 is a view showing a cross section in a longitudinal direction of one opening shaped in a slit of an electron-emitting device according to the third embodiment of the present invention.

FIG. 12I shows a schematic plan view of an electron source that is manufactured according to the present embodiment. FIG. 13 shows a schematic cross section in a longitudinal direction of a slit-like (a rectangular) opening of an electron-emitting device according to the present embodiment. FIGS. 12A to 12J show a manufacturing method of an electron source according to the present embodiment. The electron source according to the present embodiment is an example that a cathode electrode portion for supplying an electron to an electron-emitting film is defined as a resistance. Here, a characteristic part of the present embodiment is only described and the overlapped explanation is omitted.

According to the present embodiment, in Step 2 according to the second embodiment, in place of a step for forming a cathode electrode, as a cathode electrode and resistance 123, a mixed film composed of SiOxNy (x=1 to 2, y=0 to 1) and Al, having a thickness 100 nm, is formed by a co-spatter method (FIG. 12B). In addition, Step 4 of the second embodiment is omitted. Since other steps are equal to the second embodiment, the explanation thereof is herein omitted.

According to the present embodiment, using the cathode electrode and resistance 123 as the cathode electrode, the cathode electrode and resistance 123 and the focusing electrode 107 are isolated via the insulating layer 105 in the vicinity of the electron-emitting portion. Thereby, according to the electron source of the present embodiment, the same effects as the first embodiment and the second embodiment can be obtained, so that fluctuation of emission of electrons can be reduced.

In addition, since the electron source according to the present embodiment is provided with the cathode electrode and resistance 123 for each electron source as same as the electron source according to the first and second embodiments (FIG. 12B), when a plurality of electron sources according to the present embodiment is arranged in a matrix, dispersion in fluctuation of emission of electrons among respective electron sources is reduced and a beautiful image can be provided.

As same as the second embodiment, the spacer 113 having a thickness 1.6 mm and a width 200 μm is arranged on the scanning wiring 111 according to the present embodiment (FIG. 12J). Further, the FP which the phosphor is arranged is arranged thereon, and the electron beam that is emitted from the electron source is observed. For comparison, an electron source such that a shape of an opening and a distance from the spacer to the opening are the same as those of the electron source according to the present embodiment and the extended line in a longitudinal direction of the slit-like opening is in substantially parallel with the scanning wiring (the extended line does not intersect with the scanning wiring) is also manufactured. Comparing the electron source according to the present embodiment with the electron source according to a comparison example, deviation of a position of the electron beam in the electron source according to the present embodiment is largely improved as compared to the comparison example.

Fourth Embodiment

Figure 14:
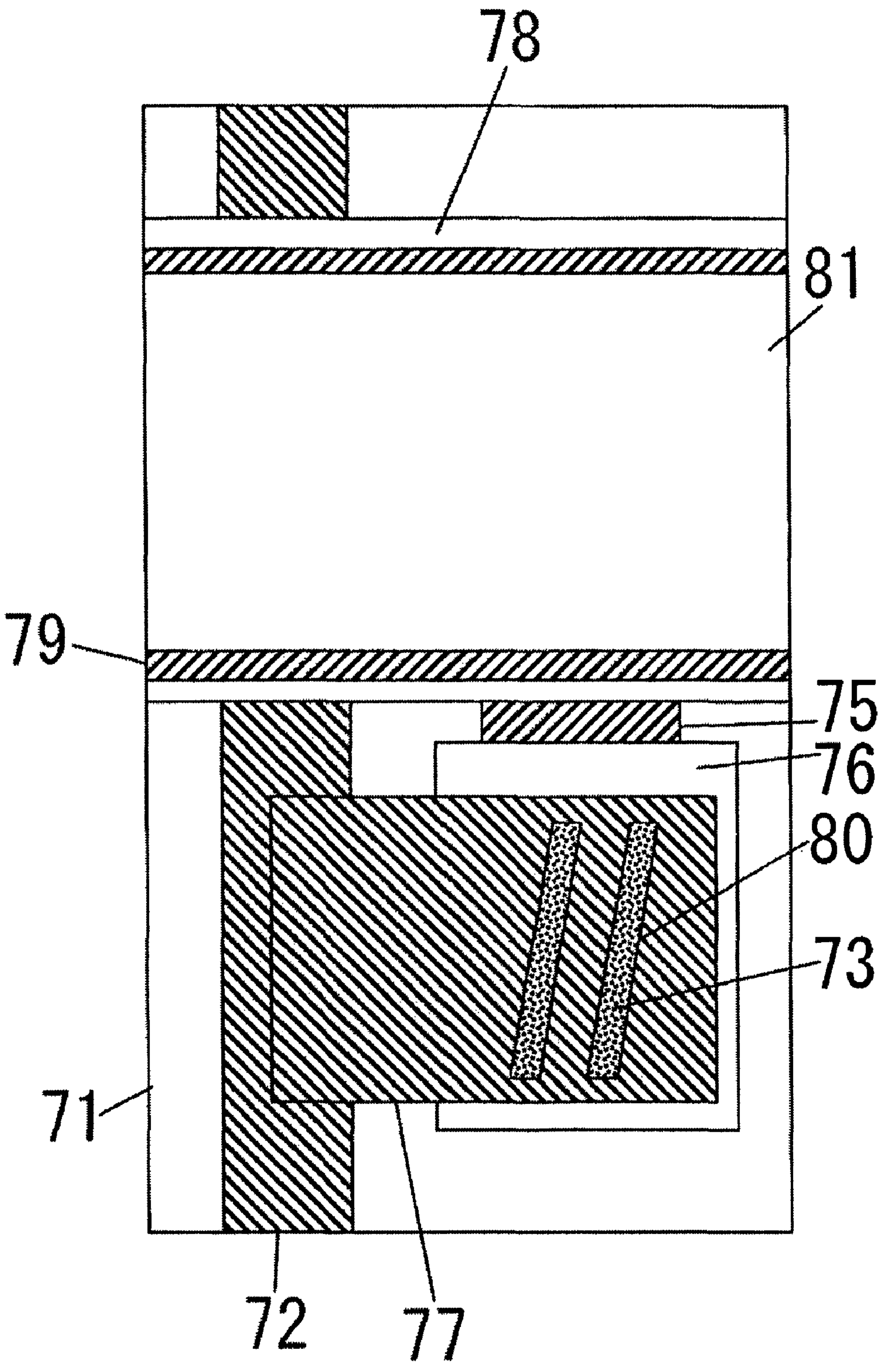
FIG. 14 is a plan view of an electron source according to a fourth embodiment of the present invention.

FIG. 14 shows a schematic plan view of an electron source that is manufactured according to the present embodiment. The electron source according to the present embodiment is an example that the extended line in a longitudinal direction of the slit-like (a rectangular) opening 80 intersects with the scanning wiring not at a right angle but obliquely. Since the present embodiment is equal to the manufacturing method of the electron source according to the first embodiment, the overlapped explanation is herein omitted.

The electron source according to the present embodiment is arranged as same as the first embodiment as shown in FIG. 9, and the shape of the electron beam is observed. As same as the first embodiment, for comparison, an electron source such that a shape of an opening and a distance from the spacer to the opening are the same as those of the electron source according to the present embodiment and the extended line in a longitudinal direction of the slit-like opening is in substantially parallel with the scanning wiring (the extended line does not intersect with the scanning wiring) is also manufactured. Comparing the electron source according to the present embodiment with the electron source according to a comparison example, deviation of a position of the electron beam in the electron source according to the present embodiment is largely improved as compared to the comparison example.

Fifth Embodiment

Figure 15:
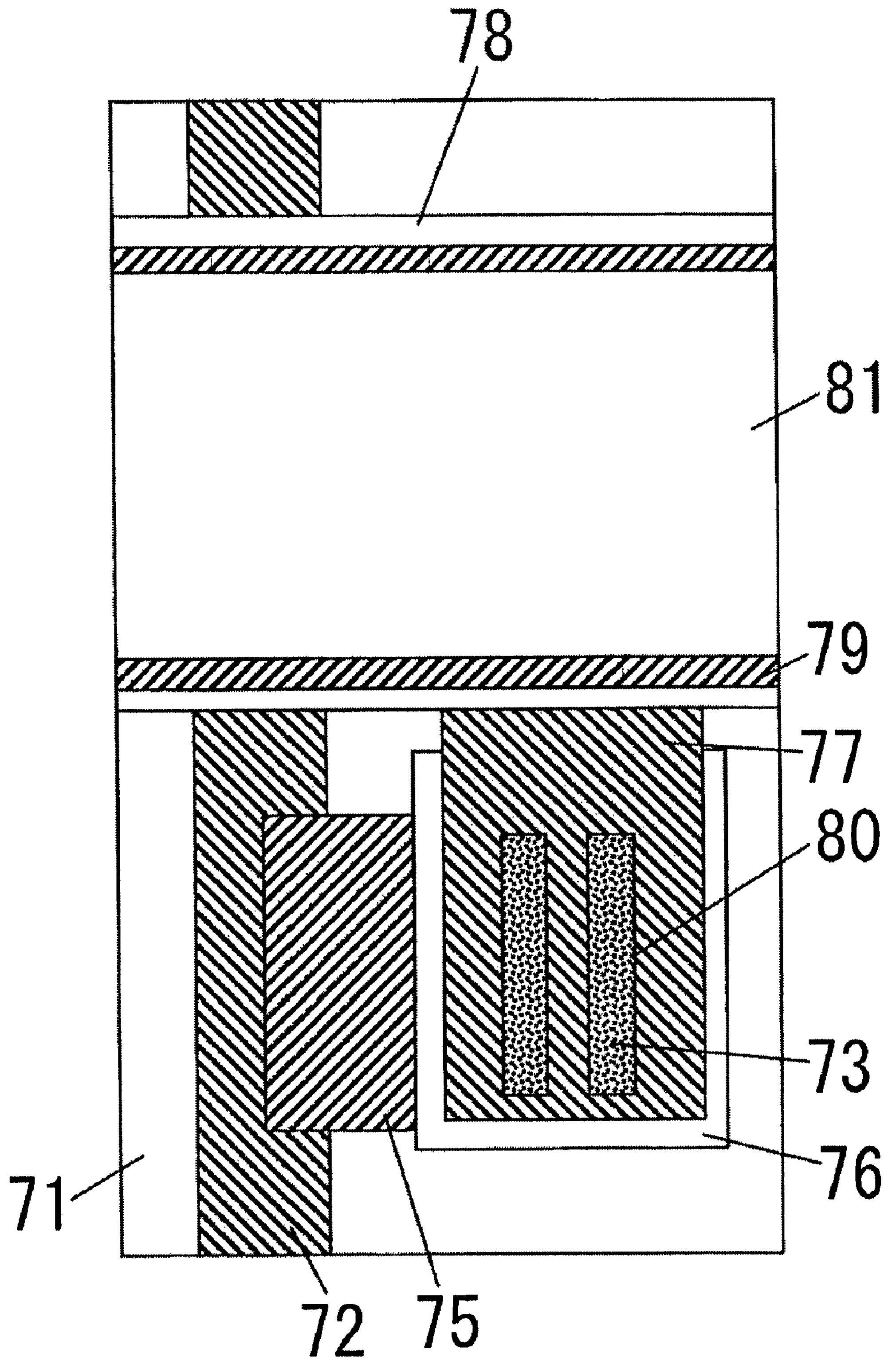
FIG. 15 is a plan view of an electron source according to a fifth embodiment of the present invention.

FIG. 15 shows a schematic plan view of an electron source that is manufactured according to the present embodiment. The electron source according to the present embodiment is an example that the convergent and cathode electrode 75 is connected to the signal wiring 72 and the gate electrode 77 is connected to the scanning wiring 79 on the contrary to the above-described electron source. According to the manufacturing method of the electron source according to the present embodiment, the convergent and cathode electrode 75 is formed so as to be connected to the signal wiring 72 in Step 4 of the first embodiment, and the gate electrode 77 is formed so as to be connected to the scanning wiring 79 in Step 8 of the first embodiment. Other steps are equal to the step of the first embodiment, so that the overlapped explanation is herein omitted.

The electron source according to the present embodiment is arranged as same as the first embodiment as shown in FIG. 9, and the shape of the electron beam is observed. As same as the first embodiment, for comparison, an electron source such that a shape of an opening and a distance from the spacer to the opening are the same as those of the electron source according to the present embodiment and the extended line in a longitudinal direction of the slit-like opening is in substantially parallel with the scanning wiring (the extended line does not intersect with the scanning wiring) is also manufactured. Comparing the electron source according to the present embodiment with the electron source according to a comparison example, deviation of a position of the electron beam in the electron source according to the present embodiment is largely improved as compared to the comparison example.

Sixth Embodiment

The electron sources of the first to fifth embodiment is arranged in a matrix of 720×160, and an image display apparatus as shown in FIG. 4 is manufactured. A plurality of electron sources is arranged at a pitch of 115 μm square and 345 μm high. A voltage of 10 kV is applied to the FP, and a voltage of 20 V is applied between the scanning wiring and the signal wiring. As a result, a high-definition image display apparatus which can be driven in a matrix can be formed.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. An electron source comprising:
   - a substrate;
   - a first wiring that is arranged on the substrate;
   - a second wiring that is arranged on the substrate and overlaps with the first wiring; and
   - an electron-emitting device having a cathode electrode provided with an electron-emitting member and a gate electrode arranged above the cathode electrode, the electron-emitting device arranged on the substrate and separated from where the first and second wirings overlap with one another,
   - wherein the first wiring is separated from the second wiring by an insulating layer,
   - the gate electrode is provided with a plurality of slit-like openings that are arranged at intervals, and
   - at least one of the plurality of slit-like openings is arranged so that an imaginary line extending in a longitudinal direction from the at least one of the slit-like openings intersects with the first wiring.

2. An electron source according to claim 1,
   - wherein the gate electrode is formed on the cathode electrode provided with the electron-emitting member via an insulating layer; and
   - a distance between the gate electrode and the cathode electrode is shorter than a distance between the gate electrode and the electron-emitting member.

3. An image display apparatus comprising:
   - an electron source according to claim 1; and
   - a substrate having a light-emitting member, which is arranged being opposed with the electron source via a spacer;
   - wherein the spacer is arranged on the first wiring.

4. An information display reproducing apparatus comprising:
   - an image display apparatus having a screen;
   - a receiver that outputs at least one of image information, character information, and voice information that are included in the received broadcast signal; and
   - a driving circuit for displaying the information outputted from the receiver on the screen of the image display apparatus;
   - wherein the image display apparatus is the image display apparatus according to claim 3.

5. An electron source comprising:
   - a substrate;
   - a first wiring that is arranged on the substrate;
   - a second wiring that is arranged on the substrate and overlaps with the first wiring; and
   - an electron-emitting device having a cathode electrode provided with an electron-emitting member and a gate electrode arranged above the cathode electrode, the electron-emitting device arranged on the substrate and separated from where the first and second wirings overlap one another,
   - wherein the first wiring is separated from the second wiring by an insulating layer,
   - the gate electrode is provided with a plurality of slit-like openings each of which an electron emitted from the electron-emitting member passes through,
   - each of the plurality of slit-like openings is arranged at an interval from at least one other of the slit-like openings, and
   - an imaginary line extending in a longitudinal direction from at least one of the slit-like openings intersects with the first wiring.

6. An electron source according to claim 5,
   - wherein the gate electrode is formed on the cathode electrode provided with the electron-emitting member via an insulating layer; and a distance between the gate electrode and the cathode electrode is shorter than a distance between the gate electrode and the electron-emitting member.

7. An image display apparatus comprising:

an electron source according to claim 5; and a substrate having a light-emitting member, which is arranged being opposed with the electron source via a spacer;

wherein the spacer is arranged on the first wiring.

8. An information display reproducing apparatus comprising:

an image display apparatus having a screen;

a receiver that outputs at least one of image information, character information, and voice information that are included in the received broadcast signal; and a driving circuit for displaying the information outputted from the receiver on the screen of the image display apparatus;

wherein the image display apparatus is the image display apparatus according to claim 7.

* * * * *